United States Patent [19]
Patton

[11] Patent Number: 5,121,482
[45] Date of Patent: Jun. 9, 1992

[54] CIRCUIT AND METHOD FOR AUTOMATIC INPUT-OUTPUT CONFIGURATION THROUGH LOCAL AREA NETWORK DETECTION

[75] Inventor: David B. Patton, Vancouver, Wash.

[73] Assignee: Hewlett-Packard Company, Palo Alto, Calif.

[21] Appl. No.: 405,496

[22] Filed: Sep. 11, 1989

[51] Int. Cl.⁵ .................... G06F 13/00; G01R 17/00
[52] U.S. Cl. .................................... 395/275; 324/656;
324/712; 324/713; 340/660; 340/664;
364/242.95; 364/927.96
[58] Field of Search ............... 364/200, 242.95, 264.2,
364/900, 927.96; 307/362; 324/705, 713, 98, 99
R, 656, 691, 712, 118, 120; 340/660, 661, 664;
371/22.5

[56] References Cited
U.S. PATENT DOCUMENTS

| | | |
|---|---|---|
| 3,978,402 | 8/1976 | Ryder ........................... 324/713 X |
| 4,008,405 | 2/1977 | Neumann et al. ................... 307/231 |
| 4,041,288 | 8/1977 | Conway et al. .............. 324/99 R X |
| 4,575,714 | 3/1986 | Rummel ......................... 324/691 X |
| 4,644,194 | 2/1987 | Birrittella et al. ............. 307/362 X |
| 4,647,912 | 3/1987 | Bates et al. ....................... 340/825.5 |
| 4,841,177 | 6/1989 | Sugiyama et al. ............. 307/362 X |
| 4,983,858 | 1/1991 | Ishikawa ............................ 307/362 |

Primary Examiner—Michael R. Fleming
Assistant Examiner—Glenn A. Auve

[57] ABSTRACT

The invented circuit includes an I/O driver capable of supplying current to an I/O connector, a current detection circuit that may include a current limit resistor and a differential amplifier, a comparator to compare the level of current to a predetermined level and to produce an output signal based thereon, and a translator to convert the output signal from the comparator into a transistor-transistor logic signal. The device that includes the invented circuit then interprets the logic signal as identifying either a serial I/O system or a LAN I/O system.

9 Claims, 2 Drawing Sheets

CIRCUIT AND METHOD FOR AUTOMATIC INPUT-OUTPUT CONFIGURATION THROUGH LOCAL AREA NETWORK DETECTION

TECHNICAL FIELD

This invention relates to a device that may operate in either a serial input-output system or a local area network input-output system. More particularly, this invention relates to a device that automatically detects whether it is part of a serial input-output system or a local area network input-output system.

BACKGROUND ART

A device such as a computer printer is connected to a host computer by a cable. The cable is attached at one end to a port on the printer and at the other end to a port on the computer. Both the printer and the host computer have input-output ("I/O") drivers to receive and transmit signals through the cable.

When a single printer serves a single computer in a stand-alone system, the signals received and transmitted between them are often asynchronous, transmitted serially in time and transmitted only on one channel. That type of I/O is commonly known as serial I/O.

Alternatively, a single printer may be part of a local area network ("LAN") and service several computers. A LAN is simply a group of interconnected devices or nodes. Devices operating in a LAN typically transmit and receive data between themselves by using LAN I/Os. LAN I/Os operate with synchronous communication and data transmission that is different and much faster than the transmission used by serial I/O systems.

To be able to use a device such as a printer on both a serial I/O system and a LAN I/O system, the device must be able to distinguish between the systems because of the different data transmission characteristics. This has been accomplished in previously existing devices by using a mode switch to toggle between serial and LAN modes. Thus, to use a printer on a LAN, the user would have to configure the system by manually setting a switch. This usually involves remembering that the system needs to be configured, referring to a manual, finding the switch on the device, determining whether it needs to be changed and if so, changing it. Often the product has to be dismantled to some extent to access the switch. If the user changes back to a serial I/O system, the switch would need to be changed back.

The invented "Circuit and Method for Automatic Input-Output Configuration Through Local Area Network Detection" automatically recognizes whether the device is part of a serial I/O system or a LAN I/O system and configures the device accordingly. The user does not have to set any switches or remember to configure the system. Additionally, the cost of the components in the invented circuit is less than the cost of a suitable switch to perform the same function. The invented circuit will allow a device to detect whether it is plugged onto a serial I/O system or a LAN I/O system.

DISCLOSURE OF THE INVENTION

The invented circuit includes an I/O driver capable of supplying current to an I/O connector, a current detection circuit that may include a current limit resistor and a differential amplifier, a comparator to compare the level of current to a predetermined level and to produce an output signal based thereon, and a translator to convert the output signal from the comparator into a transistor-transistor logic signal. The device that includes the invented circuit then interprets the logic signal as identifying either a serial I/O system or a LAN I/O system.

DETAILED DESCRIPTION AND BEST MODE FOR CARRYING OUT THE INVENTION

Figure 1:
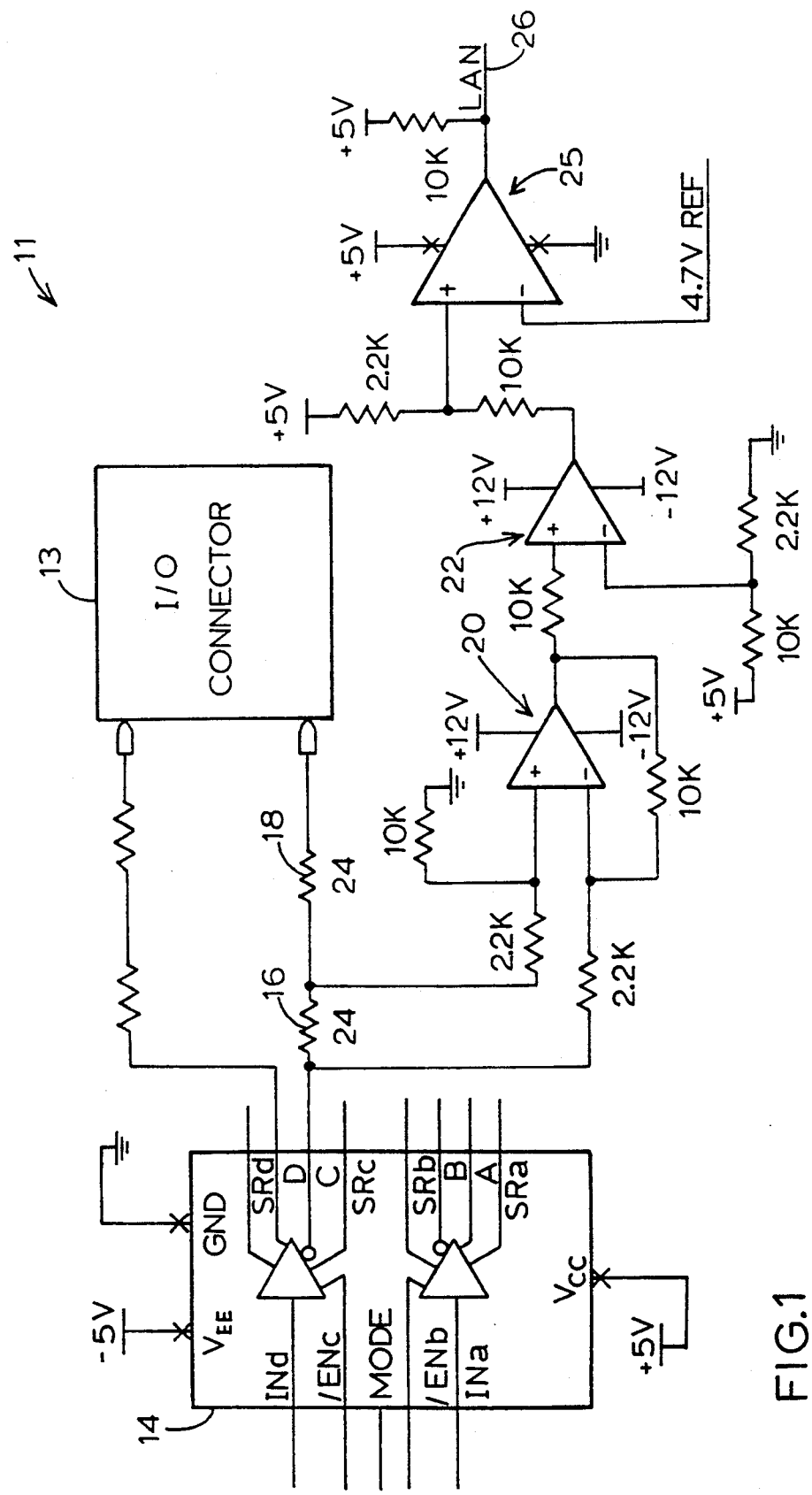
FIG. 1 is a schematic diagram of a preferred embodiment of the invented circuit.

FIG. 1 shows generally at 11 a circuit constructed according to the invention. Circuit 11 may be employed in a printer, modem or any device that may operate in either a serial I/O system or a LAN I/O system. Circuit 11 includes an I/O connector 13 to connect with other devices. Connector 13 may simply be the port on a printer that receives a cable connected to a computer, and may be referred to as I/O connector means.

Circuit 11 also includes a driver means, including an I/O driver 14 that supplies the signals to connector 13 that are to be transmitted to connected devices. In FIG. 1, driver 14 is a 26LS30 integrated circuit. The standard symbols explaining the driver are shown in the drawing to facilitate understanding but need not be discussed to understand the invention.

Between connector 13 and driver 14 is a current detection circuit including a first current limit resistor 16 and a second resistor 18. These resistors create a voltage drop between driver 14 and connector 13. In the preferred embodiment, resistors 16 and 18 each have a resistance of 24-ohms, as shown in the schematic.

When driver 14 is enabled, it may send an output signal or current to connector 13 across resistor 16. The current through resistor 16 is measured by differential amplifier 20. The output of amplifier 20 is compared with a reference signal by a comparator means including a comparator 22 and then translated into a transistor-transistor logic ("TTL") signal 26 by a translator means including a translator 25. The translator means may also be referred to as TTL circuitry. In the preferred embodiment, translator 24 is an LM339 integrated circuit. The TTL signal can then be fed into a logic input and interpreted to identify either a serial I/O system or a LAN I/O system.

FIG. 1 depicts a preferred embodiment of the invented circuit and shows the values of the circuit's components. The specific components are familiar to a person skilled in the art of electric current detection and therefore are not discussed in detail. Other values may also be used for the components shown in FIG. 1. In fact, numerous other current detection circuits may be used to determine the current from the driver to the connector. Such current detection circuits may also be referred to as detection means.

The invented circuit works because a serial I/O connection to connector 13 has different properties than a LAN I/O connection. A direct serial I/O connection has a high impedance and therefore results in a low current across resistor 16 when driver 14 is enabled. In the preferred embodiment, the current across resistor 16 generally does not exceed 3.25-mA when connector 13 is connected to a serial I/O system.

A LAN I/O connection has a low impedance because it includes a transformer and therefore, a high current and large voltage drop results across resistor 16 when driver 14 is enabled. In the preferred embodiment, the current across resistor 16 is generally 30-mA to 40-mA when connector 13 is connected to a LAN I/O system.

As explained, the current across resistor 16 changes depending on whether connector 13 is connected to a serial I/O or a LAN I/O. Amplifier 20 detects the current and outputs a signal to comparator 22, which then compares it with a predetermined reference level. If the reference level is met, translator 25 outputs a TTL signal that identifies the type of I/O system. For example, if connector 13 is connected to a serial I/O, then the current across resistor 16 is low and signal 26 is low or zero. If connector 13 is connected to a LAN I/O, then the current across resistor 16 is high and signal 26 is high or one.

OPERATION

Figure 2:
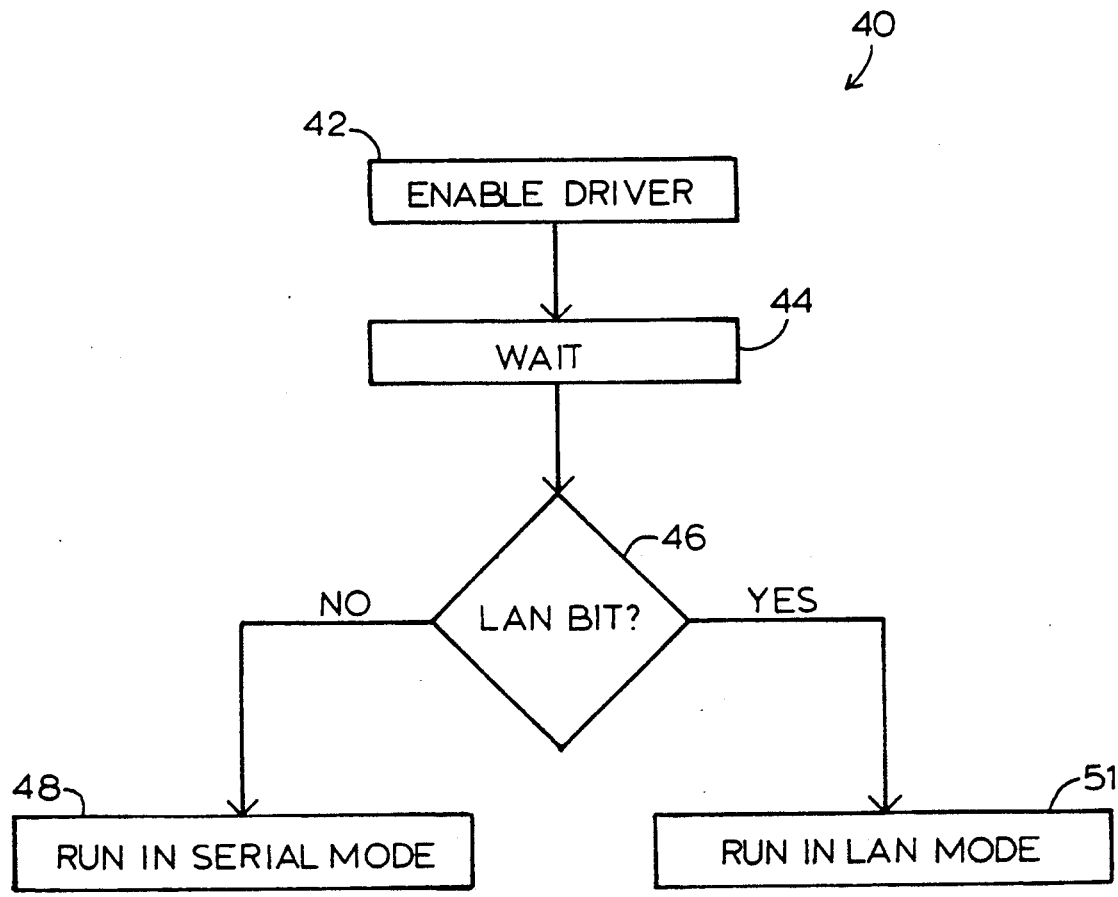
FIG. 2 is a simple block diagram showing the steps of the invented method.

The steps that are taken by circuit 11 are illustrated in FIG. 2 by a block diagram shown generally at 40. Initially, driver 14 is enabled at step 42, usually by simply turning on the device that includes circuit 11 and supplying power to the driver. The invented method waits at step 44 before detecting current across resistor 16 in order to let the circuit settle. Typically, the method waits 50-µs to 100-µs.

As represented by step 46, the method then measures the current, determines whether it is high or low across resistor 16 and generates the appropriate TTL signal, which may also be referred to as the LAN bit. If the current is low across resistor 16, then the method does not generate a LAN bit and the device identifies a serial I/O system and runs in serial mode, as shown by step 48. If the current is high across resistor 16, then the method does generate a LAN bit and the device identifies a LAN I/O system and runs in LAN mode, as shown by step 51.

INDUSTRIAL APPLICABILITY

The invented circuit and method are applicable to any device that may operate in either a serial I/O system or a LAN I/O system. Specifically, the invented circuit and method are applicable to printers, modems, computers, and other similar devices. While the best mode and preferred embodiment of the invention have been disclosed, changes may be made without departing from the scope of the invention.

What is claimed is:

1. Apparatus capable of differentiating between a connected serial input-output (SERIO) system and a connected local area network input-output (LANIO) system, said apparatus comprising:
   an input-output connector adapted for connection selectively to such a SERIO or LANIO system;
   driver means operatively connected to said connector for supplying a signal to the connector and by way of said connector to a connected system under circumstances where the connector is connected to a SERIO or LANIO system; and
   detection means operatively connected to with said connector for measuring the level of a signal supplied from said driver means through said connector to a connected system to determine whether the signal meets a predetermined level which is interpretable to differentiate between a connected serial input-output system and a connected local area network input-output system.

2. The apparatus of claim 1, wherein said detection means includes translator means for identifying a serial input-output system when the signal's level does not meet the predetermined level, and for identifying a local area network system when the signal's level meets the predetermined level.

3. The apparatus of claim 1, wherein the signal is electric current, and said detection means includes a current limit resistor through which such current flows and a differential amplifier operatively connected to said resistor to measure the current through the resistor.

4. The apparatus of claim 3, wherein said differential amplifier produces an output signal, and said detection means further includes a comparator that compares the output signal of the differential amplifier with a predetermined level to produce a comparator voltage.

5. The apparatus of claim 4, wherein said detection means includes a translator that converts the comparator voltage alternatively into high and low transistor-transistor logic levels.

6. The apparatus of claim 5, wherein said translator identifies a serial input-output system when the logic level is low, and identifies a local area network input-output system when the logic level is high.

7. A printer capable of differentiating between a connected serial input-output (SERIO) system and a connected local area network input-output (LANIO) system, said printer comprising:
   an input-output connector on the printer adapted for connection selectively to such a SERIO or LANIO system;
   an input-output driver operatively connected to said connector and capable of supplying current in different levels to said connector and by way of said connector to a connected SERIO or LANIO system;
   detection means operatively connected to said driver for detecting the level of current therefrom supplied through said connector to a connected system; and
   comparator means operatively connected to said detection means for comparing the level of any detected current with a predetermined level.

8. The printer of claim 7, further comprising translator means for causing the printer to identify a serial input-output system when the current's level does not meet the predetermined level, and to identify a local area network system when the current's level meets the predetermined level.

9. A method whereby a device having an input-output connector and an operatively connected input-output driver capable of supplying current to the connector may differentiate between a connected serial input-output system and a connected local area network input-output system, said method comprising:
   enabling the input-output driver and thereby supplying current to the connector, and by way of said connector to a connected system;
   measuring current supplied from the driver to and through the connector; and
   determining whether the supplied current is of a predetermined level, and if not, identifying a serial input-output system, but if so, identifying a local area network input-output system.

* * * * *